US008857482B2

(12) United States Patent
Taguchi et al.

(10) Patent No.: US 8,857,482 B2
(45) Date of Patent: *Oct. 14, 2014

(54) RUBBER COMPOSITION FOR TREAD, METHOD FOR PRODUCING THE SAME, AND HEAVY-LOAD TIRE

(75) Inventors: Takafumi Taguchi, Kobe (JP); Naoya Ichikawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/560,090

(22) Filed: Jul. 27, 2012

(65) Prior Publication Data

US 2013/0030083 A1 Jan. 31, 2013

(30) Foreign Application Priority Data

Jul. 28, 2011 (JP) .................. 2011-165632

(51) Int. Cl.
| B60C 1/00 | (2006.01) |
| C08K 3/04 | (2006.01) |
| C08L 7/00 | (2006.01) |
| C08C 1/15 | (2006.01) |
| C08C 1/04 | (2006.01) |
| C08L 15/00 | (2006.01) |

(52) U.S. Cl.
CPC ... *C08C 1/04* (2013.01); *C08L 7/00* (2013.01); *C08C 1/15* (2013.01); *B60C 1/0016* (2013.01); *Y02T 10/862* (2013.01); *C08L 15/00* (2013.01)
USPC .......................... 152/151; 524/572

(58) Field of Classification Search
CPC .......... B60C 1/0016; C08L 7/02; C08K 3/04; C08K 2003/04; C08C 1/04; C08C 1/14
USPC ........................................ 524/572
See application file for complete search history.

(56) References Cited

U.S. PATENT DOCUMENTS

| 4,835,216 | A |   | 5/1989 | Morikawa et al. | |
| 5,000,092 | A | * | 3/1991 | Best ........................ | 101/491 |
| 5,017,636 | A | * | 5/1991 | Hattori et al. ............ | 524/300 |
| 6,489,389 | B1 |  | 12/2002 | Ohta et al. | |
| 7,427,646 | B2 |  | 9/2008 | Kondou | |
| 8,163,821 | B2 | * | 4/2012 | Hiro ........................ | 524/115 |
| 8,273,804 | B2 | * | 9/2012 | Nishimura ............... | 523/155 |
| 2005/0027060 | A1 |  | 2/2005 | Yagi et al. | |
| 2005/0148723 | A1 |  | 7/2005 | Kondou | |
| 2005/0234186 | A1 |  | 10/2005 | Kondou | |
| 2006/0252879 | A1 |  | 11/2006 | Tanaka et al. | |
| 2007/0059232 | A1 |  | 3/2007 | Stenzel et al. | |
| 2007/0100061 | A1 |  | 5/2007 | Hattori et al. | |
| 2009/0000721 | A1 |  | 1/2009 | Imoto et al. | |
| 2010/0206444 | A1 |  | 8/2010 | Kawasaki | |
| 2011/0166254 | A1 |  | 7/2011 | Nishimura | |
| 2011/0178235 | A1 |  | 7/2011 | Sugimoto | |
| 2011/0184118 | A1 |  | 7/2011 | Sugimoto et al. | |
| 2011/0230613 | A1 | * | 9/2011 | Hiro ........................ | 524/502 |
| 2011/0253285 | A1 |  | 10/2011 | Ichikawa et al. | |
| 2011/0294949 | A1 |  | 12/2011 | Sakaki et al. | |
| 2013/0030083 | A1 |  | 1/2013 | Taguchi et al. | |
| 2013/0098523 | A1 | * | 4/2013 | Tsumori et al. .......... | 152/541 |
| 2013/0102722 | A1 | * | 4/2013 | Tsumori et al. .......... | 524/526 |
| 2013/0123387 | A1 | * | 5/2013 | Kagawa et al. .......... | 523/155 |

FOREIGN PATENT DOCUMENTS

| CN | 1692128 A | 11/2005 |
| CN | 1832967 A | 9/2006 |
| EP | 1 652 862 A1 | 5/2006 |
| EP | 2 154 192 A1 | 2/2010 |
| EP | 2 377 892 A1 | 10/2011 |
| EP | 2 476 708 A1 | 7/2012 |
| JP | 4-356205 A | 12/1992 |
| JP | 6-329702 A | 11/1994 |
| JP | 6-329838 A | 11/1994 |
| JP | 8-12814 A | 1/1996 |
| JP | 8-143606 A | 6/1996 |
| JP | 11-12306 A | 1/1999 |
| JP | 2000-344955 A | 12/2000 |
| JP | 2001-114939 A | 4/2001 |
| JP | 2002-338734 A | 11/2002 |
| JP | 2003-94918 A | 4/2003 |
| JP | 2004-67027 A | 3/2004 |
| JP | 2004-91715 A | 3/2004 |
| JP | 2004-262973 A | 9/2004 |
| JP | 2005-82622 A | 3/2005 |
| JP | 2005-82766 A | 3/2005 |
| JP | 2005-126604 A | 5/2005 |
| JP | 2005-325206 A | 11/2005 |
| JP | 2006-16622 A | 1/2006 |
| JP | 2006-152211 | 6/2006 |
| JP | 2006-307018 A | 11/2006 |
| JP | 2007-169431 A | 7/2007 |
| JP | 2008-106099 A | 5/2008 |
| JP | 2008-156446 A | 7/2008 |
| JP | 2008-214608 A | 9/2008 |
| JP | 2009-1680 A | 1/2009 |
| JP | 2009-13196 A | 1/2009 |
| JP | 2009-13197 A | 1/2009 |
| JP | 2009-191132 A | 8/2009 |
| JP | 2009-262835 A | 11/2009 |

(Continued)

OTHER PUBLICATIONS

Rhodia Silcea press release, Feb. 27, 2007.

*Primary Examiner* — Vickey Nerangis
(74) *Attorney, Agent, or Firm* — Birch, Stewart, Kolasch & Birch, LLP

(57) ABSTRACT

The present invention provides a rubber composition for a tread which enables improvement in fuel economy, breaking performance, and abrasion resistance in a balanced manner; a method for producing the rubber composition; and a heavy-load tire. The present invention relates to a rubber composition for a tread of a heavy-load tire, including a modified natural rubber having a phosphorus content of 200 ppm or less, and carbon black.

1 Claim, No Drawings

(56) References Cited

FOREIGN PATENT DOCUMENTS

| JP | 2010-138359 A | 6/2010 |
| JP | 2010-174169 A | 8/2010 |
| JP | 2011-153221 A | 8/2011 |
| JP | 2011-225680 A | 11/2011 |
| JP | 2011-231214 A | 11/2011 |
| WO | WO 03/082925 A1 | 10/2003 |
| WO | WO 2005/012365 A1 | 2/2005 |

* cited by examiner

US 8,857,482 B2

RUBBER COMPOSITION FOR TREAD, METHOD FOR PRODUCING THE SAME, AND HEAVY-LOAD TIRE

TECHNICAL FIELD

The present invention relates to a rubber composition for a tread; a method for producing the rubber composition; and a heavy-load tire produced using the rubber composition.

BACKGROUND ART

There has been an approach to decrease the rolling resistance of a tire to suppress heat build-up and thus improve the fuel economy of a vehicle. The demand for improving the fuel economy of a vehicle from the aspect of tires has increased in recent years. The demand is particularly large for improving fuel economy from the aspect of improvement of a tread or sidewall among tire components. Also in recent years, heavy-load tires for trucks and buses as well as tires for passenger vehicles are needed to improve in terms of fuel economy.

Known methods for preparing a satisfactory rubber composition with less heat build-up include a method using semi-reinforcing filler and a method using a smaller amount of reinforcing filler. However, such methods for improving fuel economy by means of filler cause a reduction in the effect of reinforcing the rubber composition, and thereby disadvantageously reduce breaking performance. Therefore, it has been difficult to achieve both high levels of fuel economy (low rolling resistance) and breaking performance.

Meanwhile, natural rubber may be used in the production of a heavy-load tire, which generally needs mastication of natural rubber. Therefore, the use of natural rubber decreases productivity. Further, the mastication causes molecular chain scission in natural rubber, thereby disadvantageously leading to a loss of the properties (e.g., effects of improving fuel economy and rubber strength) of a high-molecular-weight polymer which natural rubber essentially has.

Patent Document 1 discloses a method of adding a proteolytic enzyme and a surfactant to natural rubber latex and maturing the latex. However, the composition still has room for improving fuel economy, breaking performance, and abrasion resistance in a balanced manner.

Patent Document 1: JP 2005-82622 A

SUMMARY OF THE INVENTION

The present invention aims to solve such problems and to provide a rubber composition for a tread which enables improvement in fuel economy, breaking performance, and abrasion resistance in a balanced manner; a method for producing the rubber composition; and a heavy-load tire.

The present invention relates to a rubber composition for a tread of a heavy-load tire, comprising a rubber component including a modified natural rubber having a phosphorus content of 200 ppm or less, and carbon black.

The rubber component preferably includes 5% by mass or more of the modified natural rubber based on 100% by mass of the rubber component.

The modified natural rubber preferably has a nitrogen content of 0.3% by mass or less and a gel content of 20% by mass or less, the gel content being determined as an amount of toluene-insoluble matter.

The modified natural rubber is preferably obtained by saponifying natural rubber latex.

The modified natural rubber is preferably obtained by: (A) saponifying natural rubber latex to prepare a saponified natural rubber latex; (B) coagulating the saponified natural rubber latex and treating the resulting coagulated rubber with alkali; and (C) washing the resultant rubber until the phosphorus content of rubber reaches 200 ppm or less.

The present invention also relates to a method for producing the rubber composition, the method excluding a step of masticating natural rubber.

The present invention also relates to a heavy-load tire comprising a tread produced using the rubber composition.

According to the present invention, the rubber composition for a tread of a heavy-load tire includes a modified natural rubber having a phosphorus content of 200 ppm or less, and carbon black. Such a rubber composition enables improvement in fuel economy, breaking performance, and abrasion resistance in a balanced manner.

BEST MODE FOR CARRYING OUT THE INVENTION

The rubber composition for a tread of a heavy-load tire of the present invention contains a rubber component including a modified natural rubber having a phosphorus content of 200 ppm or less, and carbon black.

The modified natural rubber has a phosphorus content of 200 ppm or less. A phosphorus content of more than 200 ppm tends to cause an increase in the tan δ of the rubber composition, which results in a reduction in fuel economy, and to cause an increase in the Mooney viscosity of the unvulcanized rubber composition, which results in a reduction in processability. The phosphorus content is preferably 150 ppm or less, more preferably 100 ppm or less, and still more preferably 70 ppm or less. Here, the phosphorus content may be measured by a conventional method such as ICP optical emission spectrometry. The phosphorus derives from phospholipids (phosphorus compounds).

The modified natural rubber preferably has a nitrogen content of 0.3% by mass or less, more preferably 0.15% by mass or less, and still more preferably 0.1% by mass or less. A nitrogen content of more than 0.3% by mass tends to cause an increase in the Mooney viscosity in storage, which results in a reduction in processability, and to cause a reduction in fuel economy. The nitrogen content may be determined by a conventional method such as the Kjeldahl method. The nitrogen derives from proteins.

The modified natural rubber preferably has a gel content of 20% by mass or less, more preferably 10% by mass or less, and still more preferably 5% by mass or less. A gel content of more than 20% by mass tends to cause a reduction in processability and fuel economy. The gel content refers to a value that is determined as an amount of matter insoluble in toluene which is a non-polar solvent. Hereinafter, this content is also referred to simply as a "gel content" or "gel fraction". The gel content is determined by the following method. First, a natural rubber sample is immersed in dehydrated toluene and is allowed to stand for one week in a dark place protected from light. Next, the toluene solution is centrifuged for 30 minutes at $1.3 \times 10^5$ rpm so that a toluene-insoluble gel fraction and a toluene-soluble fraction are separated from each other. The toluene-insoluble gel fraction is mixed with methanol to be solidified, and then dried. Then the gel content is determined from the ratio of the mass of the dried gel fraction to the mass of the original sample.

The modified natural rubber preferably contains substantially no phospholipids. Here, the phrase "contains substantially no phospholipids" means that no phospholipid peak is present in a range of −3 ppm to 1 ppm in $^{31}$P-NMR measurement of an extract obtained by chloroform extraction from a natural rubber sample. The phospholipid peak present in a range of −3 ppm to 1 ppm refers to a peak corresponding to a phosphate ester structure in the phosphorus component of phospholipids.

The modified natural rubber may be produced by the production method disclosed, for example, in JP 2010-138359 A. Particularly, the modified natural rubber is preferably prepared by a production method including: (A) saponifying natural rubber latex to prepare a saponified natural rubber latex; (B) coagulating the saponified natural rubber latex and treating the resulting coagulated rubber with alkali; and (C) washing the resultant rubber until the phosphorus content of rubber reaches 200 ppm or less. The production method effectively reduces the phosphorus content, the nitrogen content and the like. Further, use of the modified natural rubber obtained by the method significantly improves fuel economy, breaking performance, and abrasion resistance, so that high levels of such properties are achieved.

In the production method, the saponification may be carried out by adding an alkali and optionally a surfactant to natural rubber latex and allowing the mixture to stand still for a certain period at a predetermined temperature. Here, the mixture may optionally be stirred or subjected to other operations. The saponification reduces the phosphorus content, nitrogen content and the like of natural rubber.

Examples of usable natural rubber latex include conventional latex such as raw latex, purified latex, and high-ammonia latex. Examples of the alkali used in the saponification include sodium hydroxide, potassium hydroxide, calcium hydroxide, and amine compounds. Particularly, sodium hydroxide and potassium hydroxide are preferred. Examples of the surfactant to be used include known anionic surfactants, nonionic surfactants, and amphoteric surfactants. Particularly, anionic surfactants are preferred, and sulfonate anionic surfactants are more preferred.

The amount of alkali used in the saponification may be appropriately set, and is preferably set to 0.1 to 12 parts by mass per 100 parts by mass of the solids of natural rubber latex. The amount of surfactant added is preferably 0.01 to 6.0 parts by mass per 100 parts by mass of the solids of natural rubber latex. The temperature and period of saponification may be appropriately set. The saponification is typically carried out at about 20-70° C. for about 1-72 hours.

After the saponification, the resulting saponified natural rubber latex is coagulated and the coagulated rubber is then optionally broken up. Subsequently, alkali treatment is carried out by bringing the resulting coagulated rubber or broken rubber into contact with an alkali. The alkali treatment enables an effective reduction in the nitrogen content and the like of rubber, thereby further enhancing the effects of the present invention. Examples of the coagulation method include a method of adding an acid such as formic acid to latex. The alkali treatment method is not especially limited, provided that the rubber is brought into contact with an alkali. Examples of the method include a method of immersing the coagulated rubber or broken rubber in an alkali solution.

Examples of the alkali that can be used in the alkali treatment include, as well as the alkalis described above for the saponification, potassium carbonate, sodium carbonate, sodium hydrogen carbonate, and ammonia water. Particularly, sodium carbonate is preferred because it highly contributes to the effects of the present invention.

When the alkali treatment is carried out through the immersion mentioned above, the treatment can be carried out by immersing the rubber (broken rubber) in an aqueous alkali solution with a concentration of preferably 0.1 to 5% by mass and more preferably 0.2 to 3% by mass. This further reduces the nitrogen content and the like of rubber.

When the alkali treatment is carried out through the immersion, the temperature during the alkali treatment may be appropriately set, and is typically preferably 20 to 70° C. The period of alkali treatment is preferably 1 to 20 hours and more preferably 2 to 12 hours in terms of sufficient levels of treatment and productivity although the period depends on the temperature of alkali treatment.

After the alkali treatment, washing treatment is carried out, which reduces the phosphorus content. The washing treatment may be carried out, for example, by washing by diluting the rubber component with water, followed by centrifugation or by leaving the rubber to float and then draining only the water phase to recover the rubber component. Before the centrifugation, dilution with water is first performed so that the content of the rubber component in the natural rubber latex is 5 to 40% by mass and preferably 10 to 30% by mass. The centrifugation may then be carried out at 5000 to 10000 rpm for 1 to 60 minutes, and such washing may be repeated until the phosphorus content reaches a desired value. Also when the rubber is left to float, washing may be carried out by repeating addition of water and stirring until the phosphorus content reaches a desired value. After the washing treatment, the resulting rubber is dried to give a modified natural rubber usable in the present invention.

Based on 100% by mass of the rubber component of the rubber composition of the present invention, the amount of the modified natural rubber is preferably 5% by mass or more, and more preferably 30% by mass or more. If the amount is less than 5% by mass, the fuel economy, breaking performance, and abrasion resistance may not be sufficiently improved. The amount of the modified natural rubber is preferably 90% by mass or less, and more preferably 70% by mass or less, based on 100% by mass of the rubber component. An amount of more than 90% by mass may result in insufficient abrasion resistance.

Examples of rubbers which may be contained along with the modified natural rubber in the rubber component in the present invention include diene rubbers such as natural rubber (NR), isoprene rubber (IR), butadiene rubber (BR), styrene butadiene rubber (SBR), styrene-isoprene-butadiene rubber (SIBR), ethylene-propylene-diene rubber (EPDM), chloroprene rubber (CR), and acrylonitrile butadiene rubber (NBR). Particularly, NR (unmodified) and BR are preferred because they remarkably improve fuel economy, breaking performance, and abrasion resistance.

The amount of NR (unmodified) is preferably 5% by mass or more, and more preferably 15% by mass or more, based on 100% by mass of the rubber component. An amount of less than 5% by mass may result in insufficient rough road durability. The amount of NR is preferably 90% by mass or less, and more preferably 45% by mass or less, based on 100% by mass of the rubber component. If the amount exceeds 90% by mass, the relative amount of the modified natural rubber is reduced, and therefore the effects of the present invention may be insufficiently exhibited.

The BR is not particularly limited, and examples thereof include BR with a high cis content, such as BR1220 produced by Zeon Corporation and BR130B and BR150B produced by Ube Industries, Ltd.; and BR containing a syndiotactic polybutadiene crystal, such as VCR412 and VCR617 produced by Ube Industries, Ltd. Particularly, the cis content of BR is preferably 85% by mass or more because good fuel economy, breaking performance and abrasion resistance are achieved.

The amount of BR is preferably 5% by mass or more, and more preferably 15% by mass or more, based on 100% by mass of the rubber component. An amount of less than 5% by mass may result in insufficient abrasion resistance. The amount of BR is preferably 80% by mass or less, and more preferably 25% by mass or less, based on 100% by mass of the rubber component. An amount of more than 80% by mass may result in insufficient fuel economy and rubber strength.

The total amount of the modified natural rubber and NR (unmodified) is preferably 30% by mass or more, and more preferably 70% by mass or more, based on 100% by mass of the rubber component. The total amount of the modified natural rubber and NR (unmodified) is preferably 95% by mass or less, and more preferably 85% by mass or less. If the total amount is in the above range, excellent fuel economy, breaking performance and abrasion resistance are achieved.

The total amount of the modified natural rubber, NR (unmodified), and BR is preferably 80% by mass or more, and more preferably 100% by mass, based on 100% by mass of the rubber component. If the total amount is in the above range, excellent fuel economy, breaking performance and abrasion resistance are achieved.

The nitrogen adsorption specific surface area ($N_2SA$) of carbon black is preferably 50 $m^2/g$ or more, and more preferably 100 $m^2/g$ or more. An $N_2SA$ of less than 50 $m^2/g$ may result in insufficient reinforcement. The $N_2SA$ is preferably 180 $m^2/g$ or less, and more preferably 130 $m^2/g$ or less. If the $N_2SA$ exceeds 180 $m^2/g$, the carbon black is less likely to be dispersed, which tends to cause a reduction in fuel economy.

Here, the $N_2SA$ of carbon black can be determined in accordance with JIS K6217-2: 2001.

The dibutyl phthalate (DBP) oil absorption of carbon black is preferably 50 ml/100 g or more, and more preferably 100 ml/100 g or more; but is preferably 150 ml/100 g or less, and more preferably 130 ml/100 g or less because excellent fuel economy, breaking performance and abrasion resistance are achieved.

Here, the DBP oil absorption of carbon black can be determined in accordance with JIS K6217-4: 2001.

The amount of carbon black is preferably 10 parts by mass or more, and more preferably 40 parts by mass or more, per 100 parts by mass of the rubber component. An amount of less than 10 parts by mass may result in insufficient reinforcement. The amount of carbon black is preferably 100 parts by mass or less, and more preferably 50 parts by mass or less, per 100 parts by mass of the rubber component. An amount of more than 100 parts by mass tends to cause a reduction in fuel economy.

The rubber composition of the present invention may contain wax, which enables the effects of the present invention to be achieved more successfully. Although the wax is not particularly limited, paraffin wax is preferably used because good fuel economy, breaking performance and abrasion resistance are achieved.

The amount of wax is preferably 0.5 parts by mass or more, and more preferably 1.5 parts by mass or more, per 100 parts by mass of the rubber component. The amount of wax is preferably 3.5 parts by mass or less, and more preferably 2.5 parts by mass or less. If the amount is in the above range, good fuel economy, breaking performance and abrasion resistance are achieved.

The rubber composition of the present invention may optionally contain compounding ingredients generally used in the production of rubber compositions, in addition to the ingredients described above. Examples of the compounding ingredients include oils, antioxidants of various kinds, stearic acid, zinc oxide, sulfur, and vulcanization accelerators.

The amount of oil is preferably 5 parts by mass or less, and more preferably 1 part by mass or less, per 100 parts by mass of the rubber component. Particularly preferably, the rubber composition is free of oil. Reduction in the amount of oil leads to good fuel economy, breaking performance and abrasion resistance. Also, since the Mooney viscosity of the composition including the modified natural rubber is smaller than that of the composition including NR, good processability is achieved even if the amount of oil is reduced.

The rubber composition of the present invention may be produced by a usual method. Specifically, for example, the ingredients described above are kneaded by an apparatus such as a Banbury mixer, a kneader and an open roll mill, and then vulcanized, whereby a rubber composition can be produced. In the case of producing a rubber composition including natural rubber, mastication of natural rubber is usually performed before the rubber component, filler and other components are kneaded. In the present invention, since the modified natural rubber is used, the components can be well kneaded without the mastication to give a desired rubber composition.

The rubber composition of the present invention is used for a tread of a heavy-load tire.

The heavy-load tire of the present invention may be produced by a usual method using the above rubber composition. Specifically, an unvulcanized rubber composition with various additives mixed as necessary is extruded and processed into the shape of a tread of a tire, arranged and assembled with other tire components by a usual method in a tire building machine to form an unvulcanized tire. The unvulcanized tire is then heated under pressure in a vulcanizer. Thus, a tire can be produced.

The heavy-load tire of the present invention can be suitably used for trucks and buses, and the like.

EXAMPLES

The present invention is described in more detail based on examples, and the present invention is not limited to these examples.

The chemical agents used in Production Examples are listed below. Each of the chemical agents was conventionally purified, if needed.

Natural rubber latex: Field latex obtained from Thaitex Surfactant: Emal-E27C (sodium polyoxyethylene lauryl ether sulfate) produced by Kao Corp.

NaOH: NaOH produced by Wako Pure Chemical Industries, Ltd.

(Production of Saponified Natural Rubber)

Production Example 1

The solids concentration (DRC) of natural rubber latex was adjusted to 30% (w/v). Next, to 1000 g of the (wet) natural rubber latex were added 25 g of a 10% Emal-E27C aqueous solution and 50 g of a 40% NaOH aqueous solution. Then, saponification reaction was carried out for 48 hours at room temperature. Thus, a saponified natural rubber latex was prepared. The saponified latex was mixed with water for dilution so as to have a DRC of 15% (w/v). While the resultant latex was slowly stirred, formic acid was added thereto to adjust the pH to 4.0, and the latex was coagulated.

The coagulated rubber was broken up and immersed in a 1% sodium carbonate aqueous solution at room temperature for 5 hours. Then, the rubber was removed from the solution and repeatedly washed with 1000 ml of water. The resultant rubber was subsequently dried for 4 hours at 90° C. Thus, a solid rubber (saponified natural rubber A) was produced.

Production Example 2

A solid rubber (saponified natural rubber B) was produced in the same manner as in Production Example 1, except that the amount of the 40% NaOH aqueous solution was changed to 25 g.

TSR and the solid rubbers (saponified natural rubbers A and B) produced in Production Examples 1 and 2 were measured for nitrogen, phosphorus and gel contents in the following ways. Table 1 shows the results.

(Determination of Nitrogen Content)

The nitrogen content was determined with CHN CORDER MT-5 (produced by Yanaco Analytical Instruments). In the determination, first, a calibration curve for determining the nitrogen content was prepared with antipyrin taken as a reference material. Then, an about 10 mg sample was weighted out and measured three times for nitrogen content. The average of the three measured values was determined as a nitrogen content of the sample.

(Determination of Phosphorus Content)

The phosphorus content of samples was determined with an ICP optical emission spectrometer (ICPS-8100, produced by Shimadzu Corp.).

Also, $^{31}$P-NMR measurement of phosphorus was performed as follows. Chloroform extracts from the raw rubbers were purified and then dissolved in $CDCl_3$ to prepare test samples. The test samples were analyzed with an NMR spectrometer (400 MHz, AV400M, produced by Bruker Japan Co., Ltd.) based on the standard (0 ppm) that was the determined peak of the P atom of an 80% phosphoric acid aqueous solution.

(Determination of Gel Content)

First, a 70.00 mg sample of each raw rubber cut in a size of 1 mm×1 mm was weighed out and mixed with 35 mL of toluene. The sample was allowed to stand still for one week in a cool and dark place. Next, the sample was centrifuged so that a toluene-insoluble gel fraction was precipitated, and a toluene-soluble supernatant was removed. Then, the gel fraction alone was solidified with methanol and dried. The mass of the dried gel fraction was measured, and the gel content (% by mass) was determined by the following formula.

Gel content (% by mass)=[Mass of dried gel fraction (mg)/Mass of original sample (mg)]×100

TABLE 1

|  | Saponified natural rubber A | Saponified natural rubber B | TSR |
|---|---|---|---|
| Nitrogen content (% by mass) | 0.09 | 0.22 | 0.36 |
| Phosphorus content (ppm) | 65 | 100 | 602 |
| Gelcontent (% by mass) | 4.7 | 11.7 | 29.8 |

As shown in Table 1, the nitrogen, phosphorus and gel contents of the saponified natural rubbers A and B were smaller than those of TSR.

No phospholipid peak was present in a range of −3 ppm to 1 ppm in the $^{31}$P-NMR measurement of the saponified natural rubbers A and B.

The chemical agents used in Examples and Comparative Examples are listed below.

Saponified natural rubber A: see Production Example 1
Saponified natural rubber B: see Production Example 2
Natural rubber: TSR
Polybutadiene rubber: UBEPOL BR150B ($ML_{1+4}$ (100° C.): 40, cis content: 97% by mass) produced by Ube Industries, Ltd.
Carbon black: DIABLACK I ($N_2SA$: 114 m$^2$/g, DBP oil absorption: 114 ml/100 g) produced by Mitsubishi Chemical Corp.
Wax: OZOACE 0355 (paraffin wax) produced by Nippon Seiro Co., Ltd.
Antioxidant: Antigen 6C (N-(1,3-dimethylbutyl)-N'-phenyl-p-phenylenediamine) produced by Sumitomo Chemical Co., Ltd.
Stearic acid: "Tsubaki" produced by NOF Corporation
Zinc oxide: Zinc oxide #1 produced by Mitsui Mining & Smelting Co., Ltd.
5% Oil-treated sulfur: 5% oil-treated sulfur (200 meshes) produced by Tsurumi Chemical industry Co., Ltd.
Vulcanization accelerator: Sanceler NS-G produced by Sanshin Chemical Industry Co., Ltd.

Examples and Comparative Examples

According to each formulation shown in Table 2, the materials other than the sulfur and vulcanization accelerator were kneaded with a 1.7-L Banbury mixer to form a kneaded mixture. To the resulting kneaded mixture were added the sulfur and vulcanization accelerator. They were kneaded with an open roll mill to give an unvulcanized rubber composition.

A portion of the resulting unvulcanized rubber composition was vulcanized for 30 minutes at 150° C. Thus, a vulcanized rubber composition was obtained.

Also, another portion of the unvulcanized rubber composition was formed into a tread shape and assembled with other tire components in a tire building machine. Then, the assembly was vulcanized for 30 minutes at 150° C. Thus, a test tire (tire size: 11R22.5) was produced.

The obtained vulcanized rubber compositions (vulcanized rubber sheets) and test tires were evaluated as follows. Table 2 shows the results.

(Less Heat Build-Up)

The vulcanized rubber composition of each formulation was measured for loss tangent (tan δ) with a viscoelasticity spectrometer VES (product of Iwamoto Seisakusho Co., Ltd.) under the following conditions: a temperature of 50° C.; an initial strain of 10%; a dynamic strain of 2%; and a frequency of 10 Hz. The tan δ was expressed as an index (rolling resistance index) calculated by the following equation. The larger the index value, the better the fuel economy.

(Rolling resistance index)=(tan δ in Comparative Example 1)/(tan δ of each formulation)×100

(Rubber strength)

A No. 3 dumbbell rubber specimen prepared from each of the vulcanized rubber sheets was subjected to a tensile test in accordance with JIS K 6251 "Rubber, vulcanized or thermoplastic—Determination of tensile stress-strain properties," and the tensile strength at break (TB) and elongation at break (EB) of the specimen were determined to calculate a product thereof (TB×EB). The product (TB×EB) of each formulation was used in the following formula to determine a rubber strength (TB×EB) index. The larger the rubber strength index value, the higher the rubber strength.

(Rubber strength index)=(*TB*×*EB* of each formulation)/(*TB*×*EB* in Comparative Example 1)×100

(Abrasion Resistance)

The test tires of each formulation were mounted on all wheels of a vehicle, and the vehicle was subjected to a 30000-km road test. The running distance that made the depth of pattern grooves decrease by 1 mm was determined. Using the following formula, the running distance of each formulation was expressed as an index based on the value of Comparative Example 1 taken as 100. The larger the abrasion resistance index, the better the abrasion resistance.

(Abrasion resistance index)=(Running distance of each formulation)/(Running distance in Comparative Example 1)×100

TABLE 2

|  |  | Example 1 | Example 2 | Example 3 | Example 4 | Comparative Example 1 | Comparative Example 2 | Comparative Example 3 |
|---|---|---|---|---|---|---|---|---|
| Formulation (part(s) by mass) | Saponified natural rubber A | 40 | 60 | — | — | — | — | — |
| | Saponified natural rubber B | — | — | 40 | 60 | — | — | — |
| | Natural rubber | 40 | 20 | 40 | 20 | 80 | 100 | 60 |
| | Polybutadiene rubber | 20 | 20 | 20 | 20 | 20 | — | 40 |
| | Carbon black | 45 | 45 | 45 | 45 | 45 | 45 | 45 |
| | Wax | 2 | 2 | 2 | 2 | 2 | 2 | 2 |
| | Antioxidant | 2 | 2 | 2 | 2 | 2 | 2 | 2 |
| | Stearic acid | 2 | 2 | 2 | 2 | 2 | 2 | 2 |
| | Zinc oxide | 4 | 4 | 4 | 4 | 4 | 4 | 4 |
| | 5% Oil-treated sulfur | 1.6 | 1.6 | 1.6 | 1.6 | 1.6 | 1.6 | 1.6 |
| | Vulcanization accelerator | 1 | 1 | 1 | 1 | 1 | 1 | 1 |
| Evaluation | Rolling resistance index | 110 | 115 | 109 | 116 | 100 | 100 | 90 |
| | Rubber strength index | 105 | 100 | 104 | 102 | 100 | 110 | 75 |
| | Abrasion resistance index | 105 | 104 | 106 | 104 | 100 | 90 | 130 |

The results in Table 2 clearly show that the fuel economy, breaking performance, and abrasion resistance were improved in a balanced manner in Examples in which a modified natural rubber (saponified natural rubber A or B) having a phosphorus content of 200 ppm or less and carbon black were used. In the Examples using the modified natural rubber, the rubber compositions were successfully prepared without mastication because they had excellent processability.

The invention claimed is:

1. A method for producing a heavy-load tire having a tread, said method comprising the steps of:
   (A) saponifying natural rubber latex to prepare a saponified natural rubber latex;
   (B) coagulating the saponified natural rubber latex and treating the resulting coagulated rubber with at least one alkali selected from the group consisting of potassium carbonate, sodium carbonate, sodium hydrogen carbonate, and ammonia water;
   (C) washing the resultant rubber until the phosphorus content of rubber reaches 200 ppm or less to produce said modified natural rubber;
   (D) mixing carbon black with said modified natural rubber; and
   (E) forming a heavy-load tire from the modified natural rubber and the carbon black.

* * * * *